United States Patent [19]

Tizzard et al.

[11] Patent Number: 4,728,688

[45] Date of Patent: Mar. 1, 1988

[54] PERFECT BINDING

[75] Inventors: Richard E. Tizzard, Kent; George C. Thomas, Middlesex, both of United Kingdom

[73] Assignee: Swift Adhesives Limited, England

[21] Appl. No.: 809,884

[22] PCT Filed: Apr. 3, 1985

[86] PCT No.: PCT/GB85/00147

§ 371 Date: Dec. 4, 1985

§ 102(e) Date: Dec. 4, 1985

[87] PCT Pub. No.: WO85/04669

PCT Pub. Date: Oct. 24, 1985

[30] Foreign Application Priority Data

Apr. 6, 1984 [GB] United Kingdom ............... 8409015

[51] Int. Cl.$^4$ ..................... C08J 51/00; C08L 31/02
[52] U.S. Cl. .................................. 524/504; 524/271; 525/80
[58] Field of Search ................ 524/271, 504; 525/80

[56] References Cited

U.S. PATENT DOCUMENTS

| 3,015,638 | 1/1962 | Sergi | 524/271 |
| 3,837,994 | 9/1974 | Flanagan et al. | 161/100 |
| 3,896,069 | 7/1975 | Kosaka et al. | 524/271 |
| 4,105,611 | 8/1978 | Orth, Jr. | 260/27 EV |
| 4,140,733 | 2/1979 | Meyer et al. | 524/272 |
| 4,345,349 | 8/1982 | Flanagan | 524/271 |
| 4,463,120 | 7/1984 | Collins et al. | 524/271 |

FOREIGN PATENT DOCUMENTS

| 0047932 | 3/1982 | European Pat. Off. | |
| 1300559 | 12/1972 | United Kingdom | |
| 979480A | 5/1981 | U.S.S.R. | 524/221 |

OTHER PUBLICATIONS

Gueris, "An Introduction to ELVAX EP170PS, A New Copolymer for the Adhesive Industry", (DuPont).
Gueris, "An Introduction to ELVAX 170".

Primary Examiner—Joseph L. Schofer
Assistant Examiner—Peter D. Mulcahy
Attorney, Agent, or Firm—Bacon & Thomas

[57] ABSTRACT

In two-short perfect binding of books, excellent results in terms of binding strengths, cold flow and cold crack properties, ink solvent resistance and thermal degradation susceptibility may be achieved using as a first adhesive a water based primer, e.g. a synthetic rubber latex emulsion, and as a second adhesive a hot-melt adhesive comprising a segmented monoalkene-vinyl acetate copolymer, e.g. a segmented ethylene-vinyl acetate copolymer optionally in admixture with at least one other ethylene-vinyl acetate copolymer.

5 Claims, No Drawings

PERFECT BINDING

The invention relates to an improved method of perfect binding using hot melt adhesives and to a novel adhesive system for use in such a method.

Perfect binding is the term used to describe a method of book binding in which the sheets making up a book are stacked in order to form a so-called signature which is then held in a clamp while adhesive is applied to the edge or spine to be bound whereafter a cover sheet or strip is brought into contact with the spine before the adhesive sets.

Perfect binding originally was used as a cheap and rapid binding method for so-called paperback or pocket books. However, it is now used for binding magazines, catalogues, directories, etc and even for binding signatures for case-bound books. For convenience the single term "books" is thus used hereinafter to refer to books, magazines, catalogues, etc. Particularly rapid and efficient perfect binding has been made possible by the use of hot melt adhesives which are solid at ambient temperatures and which after application in molten form at elevated temperatures, generally about 150°-180° C., cool and set rapidly, generally within about 20 seconds. Using such adhesives the bound books can be removed from their clamps to be trimmed much more rapidly than where a water-based adhesive is used as that must first be allowed to dry.

The polymer-based hot melt adhesives however do not penetrate the book spines as well as water-based adhesives and where a stronger binding is required it is known to precede the application of the hot melt adhesive by the application of a water-based primer, generally an aqueous adhesive emulsion of a polymer such as polyvinyl acetate (PVA) or vinyl acetate-ethylene copolymer (VAE). This so called "two-shot" adhesive system lengthens the time required for binding as at least partial drying of the primer must be permitted before application of the hot-melt adhesive but the penetration of the water based adhesive results in a stronger binding than is achieved with the so-called "one-shot" system where only the hot-melt adhesive is used.

The one-shot system is nevertheless still more widely used than the two-shot system, the latter in general being adopted only where the binding needs to conform to rigorous standards such as is the case for example with books with world wide distribution which have to withstand extremes of high and low temperatures.

Thus at low temperature, one-shot perfect bound books are liable to cold crack where the book cracks or splits along the spine, and at high temperatures they are liable to cold flow under stress where the individual pages "creep" out of the adhesive binding. This is termed "cold" flow because it occurs at temperatures cooler than the softening temperature of the hot melt adhesive.

Several hot melt adhesives have been used in two-shot perfect binding but in recent years the preferred hot melt adhesives for such systems have been based on the aromatic monovinyl - conjugated diene block copolymers (hereinafter AMCD) available from Shell Chemical Co. under the trade Mark Kraton. The use of AMCD based hot melt adhesives in perfect binding is disclosed in U.K. Pat. No. 1219394 of National Starch and Chemical Corporation.

Before the AMCD adhesive system of U.K. Pat. No. 1219394, ethylene vinyl acetate (EVA) copolymer based hot melt adhesives, which are still widely used in one-shot binding, had been used in two-shot binding. However, as acknowledged in U.K. Pat. No. 1219394, EVA two-shot binding was unsatisfactory in that books produced thereby were found to exhibit relatively poor cold crack and cold flow properties and also to exhibit poor adhesion between the primer and the hot melt adhesive. The poor adhesion at the primer-hot melt interface is thought to be due at least in part to the inability of the EVA to absorb moisture and bind to incompletely dried primer. Attempts to improve the binding by using as a primer an adhesive based on VAE rather than PVA to provide improved compatibility with EVA were only marginally successful and did not produce bindings either having satisfactory cold flow and cold crack properties or comparable to the two-shot bindings of U.K. Pat. No. 1219394.

Two-shot binding using AMCD-based hot melt adhesives can be hindered by the thermal instability of AMCD which if held for extended time in the molten state ready for application drops in viscosity relatively quickly and discolors unless an inert gas blanket is maintained over the melt. Discoloration is of course unsightly and reduces the attractiveness of the bound book to the purchaser. The susceptibility to thermal degradation of the AMCD-based adhesives means that the binding of the books can be weakened. The melt flow properties of the AMCD-based adhesives are also not entirely satisfactory, hindering application of the hot melt adhesive and resulting in some inconsistency in binding strengths of the bound books. Moreover, the AMCD-based two-shot adhesive systems show relatively poor ink solvent resistance.

We have now suprisingly found that segmented monoalkene-vinyl acetate, e.g. EVA, based hot melt adhesives can be used in two-shot perfect binding achieving satisfactory binding strengths and cold flow and cold crack properties and have a reduced susceptibility to thermal degradation and an enhanced ink solvent resistance relative to AMCD-based hot melt adhesives.

In one aspect the invention thus provides a method of perfect binding using as a first adhesive a water-based primer and as a second adhesive a hot-melt adhesive, characterised in that said hot-melt adhesive comprises a segmented monoalkene-vinyl acetate copolymer.

By "segmented" it is meant that the polymer chain has regions or segments in which the occurrence of acetate side groups is relatively high and regions or segments in which the occurrence of acetate side groups is relatively low. This is schematically illustrated in the following "formulae":

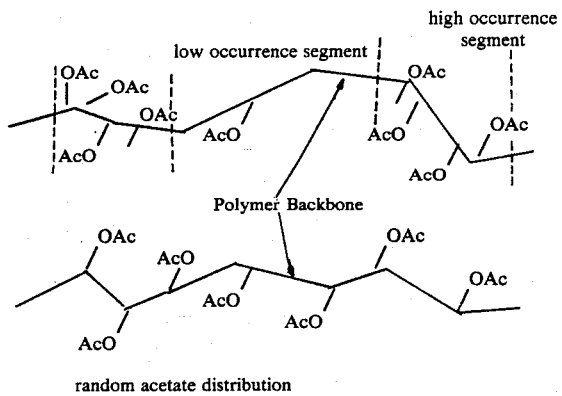

random acetate distribution

The segmented polymers, preferably EVA copolymers, may for example be produced by grafting together monoalkene-vinylacetate copolymers having different vinyl acetate contents.

A segmented EVA copolymer suitable for use in the method of the invention is available under the Registered Trade Mark ELVAX 170 (formerly known as ELVAX EP 170 PS) from E. I. Du Pont de Nemours and Company who suggest their product to be particularly suitable for use in hot melt pressure sensitive adhesives and in other conventional areas of EVA usage.

We have found that despite the known inability of previous EVA-based hot melt adhesives to provide adequate cold flow and cold crack properties in two-shot binding, the use of segmented EVA, optionally in combination with conventional EVA, in two-shot binding yields bindings with good or excellent cold flow and cold crack properties.

Furthermore, compared with AMCD-based hot-melt adhesives, segmented EVA-based hot-melt adhesives have been found to have better melt flow and ink solvent resistance characteristics, reduced susceptibility to thermal degradation, reduced thermal discoloration even after use without the precaution of an inert gas blanket and reduced susceptibility to shear degradation in adhesive manufacture.

In a preferred embodiment, the method of the present invention comprises the steps of (a) applying to the prepared spine of a set of clamped signatures an aqueous primer emulsion, preferably an aqueous synthetic latex primer;

(b) applying to said spine a melted adhesive composition comprising (i) at least one segmented EVA, (ii) at least one tackifying resin, (iii) at least one antioxidant, and optionally (iv) at least one other EVA; and (c) applying to said spine while the said adhesive composition is open a cover member, e.g. a cover sheet or strip.

In a further aspect the invention provides a two shot adhesive system comprising, separately, (a) an aqueous primer emulsion, preferably an aqueous synthetic latex primer emulsion; and (b) an adhesive composition, solid at ambient temperatures, having a softening point in the range 65° to 120° C., preferably 70° to 110° C., and comprising (i) at least one segmented EVA, (ii) at least one tackifying resin, (iii) at least one antioxidant, and optionally (iv) at least one other EVA.

In a yet further aspect the invention provides an adhesive composition, solid at ambient temperatures, having a softening point in the range 65° to 120° C., preferably 70° to 110° C., and comprising (i) at least one segmented EVA, (ii) at least one tackifying resin, (iii) at least one antioxidant, and (iv) at least one other EVA.

While the method of the present invention is a method involving application of a primer followed by application of a hot-melt adhesive, i.e. a two-shot binding method, the invention is particularly advantageous in practice since the operator may, using binding apparatus set up to perform the method of the invention, simply omit the application of the primer and perform a one-shot binding using the hot-melt adhesive whenever the binding requirements are not such that the more secure and higher quality two-shot binding is necessary. Thus unlike many two-shot adhesive systems, the second shot adhesive for the two-shot system of the invention is capable of producing highly satisfactory bindings in a single shot binding method. This ability to change readily from two-shot to one-shot binding without changing binding equipment or adhesive loading represents a major practical advantage over for example two-shot binding using AMCD- based hot melt adhesives.

The aqueous primer emulsion may be a PVA emulsion or an emulsion of VAE (which has increased compatibility with EVA and increased flexibility relative to PVA). However, rubber latex emulsions, especially synthetic latex emulsions, are particularly preferred. Emulsions having 50–65% solids are preferred and may contain, stabilizers, such as polyvinylalcohol, wetting agents, anti-foaming agents and/or bactericides. The aqueous primer emulsion is generally applied in film thicknesses of about 0.002–0.005 ins (51 to 127 μm) and is partially or completely dried before the hot melt adhesive is applied.

Examples of suitable primer emulsions are VAE emulsions (such as that available under the trade name Mowilith DM 105 from Harlow Chemical Co., Ltd of Harlow), natural rubber latex emulsions (such as the 60% centrifuged ammonia stabilized emulsion available as Dynatex Low Ammonia Latex from William Symington & Sons Ltd., of London), homo- or copolymer synthetic rubber latex emulsions such as styrene-butadiene rubber (SBR) latex (preferably having a styrene content of 40–50%, e.g. Dow Latex 242 available from Dow Chemical Company Ltd. of London), carboxylated styrene-butadiene rubber latex (e.g. Dow Latex XD 8230.03 also available from Dow Chemical Company Ltd.), polychloroprene rubber latex (e.g. Neoprene Latex 842A available from Du Pont (UK) Ltd. of Hemel Hempstead), acrylic rubber latex (e.g. Vinnapas EAF 60 available from Wacker-Chimie GmbH of Munich), aqueous polyurethane emulsions (available from BASF (UK) Ltd of Cheadle Hulme, Cheshire), and mixtures of two or more such primers (e.g. a mixture of a VAE emulsion and acrylic rubber latex).

The aqueous primer base preferably has a glass transition temperature at or below 0° C., especially preferably in the range −40° C. to −5° C. and, in the case of primers based on synthetic rubber latex, the synthetic polymers are conveniently polymers prepared by emulsion polymerization. The aqueous primer may, as required, additionally contain components such as antioxidants.

The optimum temperature ranges for the cold crack and cold flow properties of books bound according to the invention are dependent on the aqueous primer system used thus natural rubber latex gives a broader temperature range than for example Mowilith DM 105 and by mixing Vinnapas EAF 60 with Mowilith DM 105 the temperature range may be shifted downwards. The rubber latexes are thus generally preferred and the synthetic rubber latexes are preferred over the natural rubber latexes by virtue of their improved machinability during application.

The hot melt adhesive composition will generally contain the EVA and the tackifying resin in a weight ratio of 4:3 to 4:5, preferably 4:3 to 8:9 and most preferably about 1:1.

The total EVA content will generally be present in the adhesive composition at from 30 to 50% by weight, preferably 35–45% and most preferably about 40%.

The preferred EVA content of the adhesive composition, in terms of segmented and non-segmented EVA's will depend upon the balance between viscosity and open time that is to be achieved. In general the formulation containing the blend of EVA's should have open times of from 2 to 20, preferably 5 to 15, seconds and viscosities (measured at 175° C.) of 1.5 to 10.0 Pa.s, preferably 2.0 to 6.0 Pa.s and most preferably 2.5 to 4.0 Pa.s. Using a segmented EVA such as ELVAX 170, from about 25 to 75%, preferably 25 to 50%, especially preferably 30 to 40% and most preferably about 35%, of the total EVA content of the adhesive composition may be segmented EVA.

Suitable non-segmented, i.e. conventional, EVA's for incorporation into the hot melt adhesive composition include those having vinyl acetate contents of from 12 to 35%, preferably 18 to 33%. It can be particularly beneficial to use more than one such conventional EVA and to achieve the desired viscosity, open time and binding strengths it has been found particularly suitable to employ a mixture of 18 and 28% vinyl acetate EVA's.

Commercially available conventional EVA's are characterised by both their vinyl acetate contents and their melt flow index (MFI). MFI's are effectively a measure of the molecular weight of the copolymer and EVA's having MFI's within a wide range, e.g. 5-800, are suitable for use in the present invention.

Besides incorporating segmented and non-segmented EVA's into the hot melt adhesive composition, it may be desirable to include a colouring agent, e.g. a whitener such as titanium dioxide. Such colouring agents are particularly readily dispersed within the hot melt adhesive if introduced as solid dispersions in EVA. Thus for example small quantities, e.g. 0.1 to 4%, of a 1:1 dispersion of TiO$_2$ in EVA (available under the trade name E/Va white M/B from ICI, Plastics Division of Welwyn Garden City) may be included in the hot melt adhesive composition.

The tackifying resin component of the hot melt adhesive compositions of the invention may comprise any suitable resin or resin mixture such as are conventional for hot melt adhesives used for perfect book binding. The resin or resin mixture should be selected to achieve the desired balance between compatibility with the EVA and any further components of the composition, the melt flow properties of the composition as a whole and the specific adhesion of the composition to primer-treated signatures and cover materials.

In this respect, suitable tackifying resins may include: rosins, natural or modified, e.g. rosin esters such as Pentalyn 344 available from Hercules Chemical Co. of London; α-methyl styrene homopolymers or copolymers, e.g. Kristalex FR75 (a modified α-methyl styrene copolymer) or Piccotex (a vinyl toluene - α-methyl styrene copolymer) both available from Hercules Chemical Co.; polyterpene resins; phenolic modified terpene resins; aliphatic petroleum hydrocarbon resins; and styrene-modified hydrocarbon resins.

The hot melt adhesive compositions of the invention contain an anti-oxidant. However, unlike the Kraton AMCD-based adhesives which generally require a blend of anti-oxidant stabilizers in view of their relative thermal instability, only a single anti-oxidant is required.

In this respect, conventional EVA anti-oxidants, such as butylated hydroxy toluene (BHT) may be used. A preferred anti-oxidant is pentaerythritoltetrakis-3-(3,5-di-tert.butyl-4-hydroxyphenyl)propionate, which is available under the trade name Irganox 1010 from Ciba-Geigy UK Ltd. of Manchester. The anti-oxidant will generally be present in the adhesive composition at about 0.2 to 2%, preferably 0.4 to 1%, by weight.

The hot melt adhesive composition may also contain further components such as diluents or modifiers. These components may serve to regulate the viscosity and setting speed of the adhesive and may be included to enhance the wicking of the adhesive into the pages and cover member. In this respect polyolefins (e.g. low crystallinity medium range molecular weight homo- or copolymers, such as that available under the trade name Vestoplast 608 from Hüls (UK) Ltd of Manchester) and conventional diluents and modifiers for hot melt adhesives, such as waxes (e.g. petroleum waxes such as paraffin waxes or microcrystalline waxes), low molecular weight polyethylene, atactic polypropylene, hydrogenated animal or vegetable fats (e.g. hydrogenated castor oil or hydrogenated tallow), and synthetic waxes, such as Fischer Tropsch waxes, may be used.

Where waxes or low molecular weight polyethylenes are used as diluents, they should conveniently have softening temperatures in the range 50° to 120° C. We have found a mixture of low molecular weight polyethylene, such as polyethylene AC6 or AC8 available from Allied Chemical Corporation International NV, SA of Birmingham, and a microcrystalline wax having a softening temperature of about 90° C., such as Micro 549 available from Holmes Chemical Company of Uxbridge, to be particularly suitable, especially where the polyethylene and the wax constitute about 5 and about 15% by weight respectively of the adhesive composition.

The hot melt adhesive composition is generally applied in film thicknesses of up to about 0.050 ins (1.3 mm), preferably 0.015 to 0.040 ins (0.35 to 1.0 mm), although this can be achieved by applying a larger amount and scaping off the excess.

In a still further aspect, the present invention provides books bound by the two-shot perfect binding method of the invention.

The following Examples are provided to illustrate the invention further without limiting the scope of protection sought therefor (percentages and parts are by weight unless otherwise specified):

EXAMPLES (a) Hot Melt Adhesive

The following hot melt adhesive compositions are formulated:

(i)

| | |
|---|---|
| ELVAX 170 | 14.0% |

-continued

| | | |
|---|---|---|
| (segmented EVA copolymer) | | |
| *28-150 (EVA copolymer) | 20.0% | 40.0% EVA |
| 18-150 (EVA copolymer) | 5.0% | 1.0% TiO$_2$ |
| ≠EVA:TiO$_2$ (1:1 weight ratio) | 2.0% | |
| Micro 549 (microcrystalline wax - softening point 91° C.) | 14.0% | 19.5% diluent/ modifier |
| Polythene AC6 | 5.5% | |
| Irganox 1010 (antioxidant) | 0.5% | 0.5% anti-oxidant |
| Pentalyn 344 (rosin ester) | 22.5% | 39.0% tackify-ing resin |
| Kristalex FR75 (α-methyl styrene copolymer) | 16.5% | |
| | 100.0% | 100.0% |
| (ii) | | |
| ELVAX 170 (segmented EVA copolymer) | 16.0% | |
| EVA 28-150 | 15.5% | 40.5% EVA |
| EVA 33-25 | 8.0% | 1.0% TiO$_2$ |
| ≠≠EVA: TiO$_2$ | 2.0% | |
| Okerin 175 (microcrystalline wax - softening point 79° C.) | 16.0% | 22.0% diluent/ modifier |
| Vestoplast X3632 (polyolefin copolymer) | 6.0% | |
| Irganox 1010 (antioxidant) | 0.5% | 0.5% anti-oxidant |
| Pentalyn 344 (rosin ester) | 18.0% | 36.0% tackify-ing resin |
| Nirex 1085 (polyterpene resin) | 18.0% | |
| | 100.0% | 100.0% |
| (iii) | | |
| ELVAX 170 (segmented EVA copolymer) | 16.0% | |
| 28-150 (EVA copolymer) | 14.0% | 38.0% EVA |
| 28-25 (EVA copolymer) | 7.0% | 2.0% TiO$_2$ |
| ≠≠≠EVA: TiO$_2$ (1:1 weight ratio) | 2.0% | |
| Okerin 175 (microcrystalline wax - softening point 79° C.) | 16.0% | 23.0% diluent/ modifier |
| Polythene AC6 | 4.0% | |
| Cariflex 1107 | 4.0% | |
| Irganox 1010 (antioxidant) | 0.5% | 0.5% anti-oxidant |
| Pentalyn 344 (rosin ester) | 30.0% | 37.5% tackify-ing resin |
| 85 (rosin ester) | 7.5% | |
| | 100.0% | 100.0% |

*28-150 implies a 28% vinyl acetate content and an MFI of 150
≠33-25 EVA
≠≠33-25 EVA
≠≠≠33-25 EVA (b) Primer The following primer systems are used:

(i) Mowility DM 105 (55% solids VAE emulsion).
(ii) 3 parts Mowilith DM 105 and 1 part Vinnapas EAF 60 (60% solids acrylic terpolymer emulsion)
(iii) Dynatex Low Ammonia Latex (60% solids natural rubber latex)
(iv) Dow Latex 242 (SBR latex, about 45% styrene)
(v) Dow latex XZ 86829
(vi) Du Pont Neoprene 842 A (polychloroprene latex)

PERFORMANCE

On books machine bound using adhesives (a) and (b) in a two-shot perfect binding, cold flow, measured at 40° C., and cold crack, measured at −5° C., properties were generally very good and well superior to these properties for bindings achieved with two-shot perfect binding using only non-segmented EVA in the hot melt adhesive. On hand-bound books bound using adhesives (a)(i) and (b)(i) cold flow and cold crack properties were also generally very good.

We claim:

1. A two-shot adhesive comprising, separately
   (a) an aqueous primer emulsion; and
   (b) an adhesive composition, solid at ambient temperature, having a softening point in the range 65° to 120° C. and comprising (i) at least one segmented ethylene-vinyl acetate (EVA) copolymer, (ii) at least one tackifying resin, (iii) at least one antioxidant, and (iv) at least one other EVA, said segmented EVA constituting from 25 to 50% by weight of the EVA in said adhesive composition.

2. An adhesive composition, solid at ambient temperatures having a softening point in the range 65° to 120° C. and comprising (i) at least one segmented ethylene-vinyl acetate (EVA) copolymer, (ii) at least one tackifying resin, (iii) at least one antioxidant, and (iv) at least one other EVA, said segmented EVA constituting from 25 to 50% by weight of the EVA in said composition.

3. A composition as claimed in claim 2 wherein said EVA and said tackifying resin are present in a weight ratio of from 4:3 to 4:5.

4. A composition as claimed in claim 2 further comprising at least one colouring agent, diluent or modifier.

5. A composition as claimed in claim 2 wherein said segmented EVA constitutes from 30 to 40% by weight of the EVA in said composition.

* * * * *